United States Patent [19]

Tucker

[11] 3,851,119

[45] Nov. 26, 1974

[54] WALL MOUNT FOR TELEPHONES

[75] Inventor: Council A. Tucker, Los Angeles, Calif.

[73] Assignee: American Telecommunications Corporation, El Monte, Calif.

[22] Filed: Apr. 9, 1973

[21] Appl. No.: 348,956

[52] U.S. Cl. .............................................. 179/146 R
[51] Int. Cl. .............................................. H04m 1/11
[58] Field of Search ......................... 179/146 R, 178

[56] References Cited

UNITED STATES PATENTS 1,813,887 7/1931 Cadieux ......................... 179/100 R

*Primary Examiner*—William C. Cooper
*Attorney, Agent, or Firm*—Christie, Parker & Hale

[57] ABSTRACT

The wall mount for a telephone is attached to a permanently installed telephone outlet in a wall by engaging a guide of the mount with a faceplate of the outlet and swinging the mount against the outlet and flush against the wall. A latch of the mount is opened to present key holes to studs of the outlet, and when the key holes are in register with the studs, the latch is released and locked by interference between reduced diameter portions of the studs and the edges of necks of the key holes. The mount is then secured in place. The guide has a catch which keeps it open preliminarily to swinging the mount into place.

19 Claims, 6 Drawing Figures

PATENTED NOV 26 1974 3,851,119

SHEET 1 OF 3

WALL MOUNT FOR TELEPHONES

BACKGROUND OF THE INVENTION

The present invention relates in general to the art of telephones, and, more in particular, to an apparatus which is useful for mounting a telephone to a wall.

Wall mounted telephones are popular in a variety of locations, for example, in a kitchen or a workshop. Very simply, wall mounted telephones are mounted on a wall at a convenient height for the telephone user.

It is being suggested that with the increased use of telephones, several permanently installed telephone outlets be provided for a telephone user. The user would then purchase the desired number of telephone instruments and install them in desired permanent outlets. Even in the instance where a telephone company installs telephone equipment, permanently installed outlets enjoy the advantages of easy telephone installation, maintenance, and flexibility of telephone location.

While the provision of several telephone outlets at a telephone service terminus in and of itself affords considerably greater flexibility than having a new telephone outlet wired to each desired location every time a change of telephone location is desired, the concept suffers unless some means can be provided to enable the installation of a telephone to a permanently installed outlet without rewiring or wiring the telephone to the outlet. Clearly, a plug and jack for the telephone instrument and wall connection, respectively, provide an ideal vehicle for telephone installation without wiring.

In wall mounted telephones, however, it is necessary that the telephones be mounted flush against the wall and that some provision be made to carry the considerable weight of the instrument. For appearance sake it is also required that the plug and jack used to connect the telephone to the service lines not be visible after a wall mounted telephone is in place. Because of this appearance requirement, it is desirable to have the plug and jack masked by the telephone instrument proper. This presents the problem of making the connection between the telephone instrument and the telephone outlet during the mounting of the instrument flush against the wall. An additional problem is in bearing the considerable weight of the telephone instrument without reliance on the plug and jack.

Accordingly, there is a need for a means to mount a telephone instrument flush against a vertical wall while at the same time coupling the telephone instrument through a plug in the telephone plug receptacle or jack, and to support the telephone instrument essentially independently of the plug and jack.

SUMMARY OF THE INVENTION

The present invention provides a wall mount for a telephone instrument which is capable of completely masking a telephone outlet while lying flush against the wall onto which the telephone is to be mounted. The wall mount is characterized in its ease of installation and removal for service and replacement. The wall mount is capable of sustaining the load of the telephone independently of the plug and jack used to connect the telephone with the telephone service lines.

In general, the present invention contemplates a base adapted for the mounting of a telephone instrument. The base has means for securing the mount to a telephone wall outlet, means for selective removal of the mount and the telephone instrument from the outlet, and guide means registrable with the telephone outlet for guiding a plug installed in the mount into a jack receptacle of the outlet.

A specific form of the present invention contemplates a base having a selectively actuatable locking latch for locking the mount with a telephone outlet. The latch is translationally mounted in the base and biased into a closed or locked position. The latch has means, such as key holes, for locking with studs of the outlet. The guide is preferably pivotally mounted in the base for rotation between an open and a closed position. Ears of the guide are capable of registering with an upper surface of the faceplate and with vertical side surfaces thereof for the lateral and vertical indexing of the unit with the faceplate. The mount can be rotated about the pivotal axis of the guide flush against the wall while the guide maintains the lateral and elevational index. A plug carried by the base has stabs for receipt in stab receptacles of the jack mounted in the faceplate. The plug is capable of limited rotational movement during insertion of the stabs in the receptacles to accommodate the angular misalignment between the mount and the jack when the mount is being rotated against the wall. Preferably, the latch just secures the mount to the faceplate. Lateral and longitudinal movements of the mount with respect to the faceplate are prevented by ribs of the base which extend the depth thereof and engage the longitudinal and lateral edges of the faceplate.

Preferably the guide has means to keep it in its open position until the mount is rotated about the pivotal axis of the guide. These means may include interfering members of the base and guide which allows the member of the guide to snap over the member of the base to keep the guide open and then to snap back over the member of the base when the mount is forced to rotate into position against the wall. It is also preferred to have means to determine the open position of the guide such as engageable catches of the guide and the base.

It is preferred to mount the latch beneath longitudinally extending straps secured to the base and on a pair of longitudinally spaced-apart and laterally extending saddles. Lateral pillars defining the ends of the saddles provide lateral guides for the latch, and ribs defining the saddle's base provide depth indexing for the latch. The latch itself has a pair of longitudinally extending rails offset from the plane of the balance of the latch which guide on the saddles.

Travel of the latch is limited by a lug of the base disposed between stops of the latch corresponding to its locked and open positions. Preferably a flag of the latch extends out of the base when the latch is not locked on the studs of the faceplate to ensure that the blind latching required has been effected.

These and other features, aspects and advantages of the present invention will become more apparent from the following description, appended claims and drawings.

DESCRIPTION OF THE PREFERRED EMBODIMENT

Figure 1:
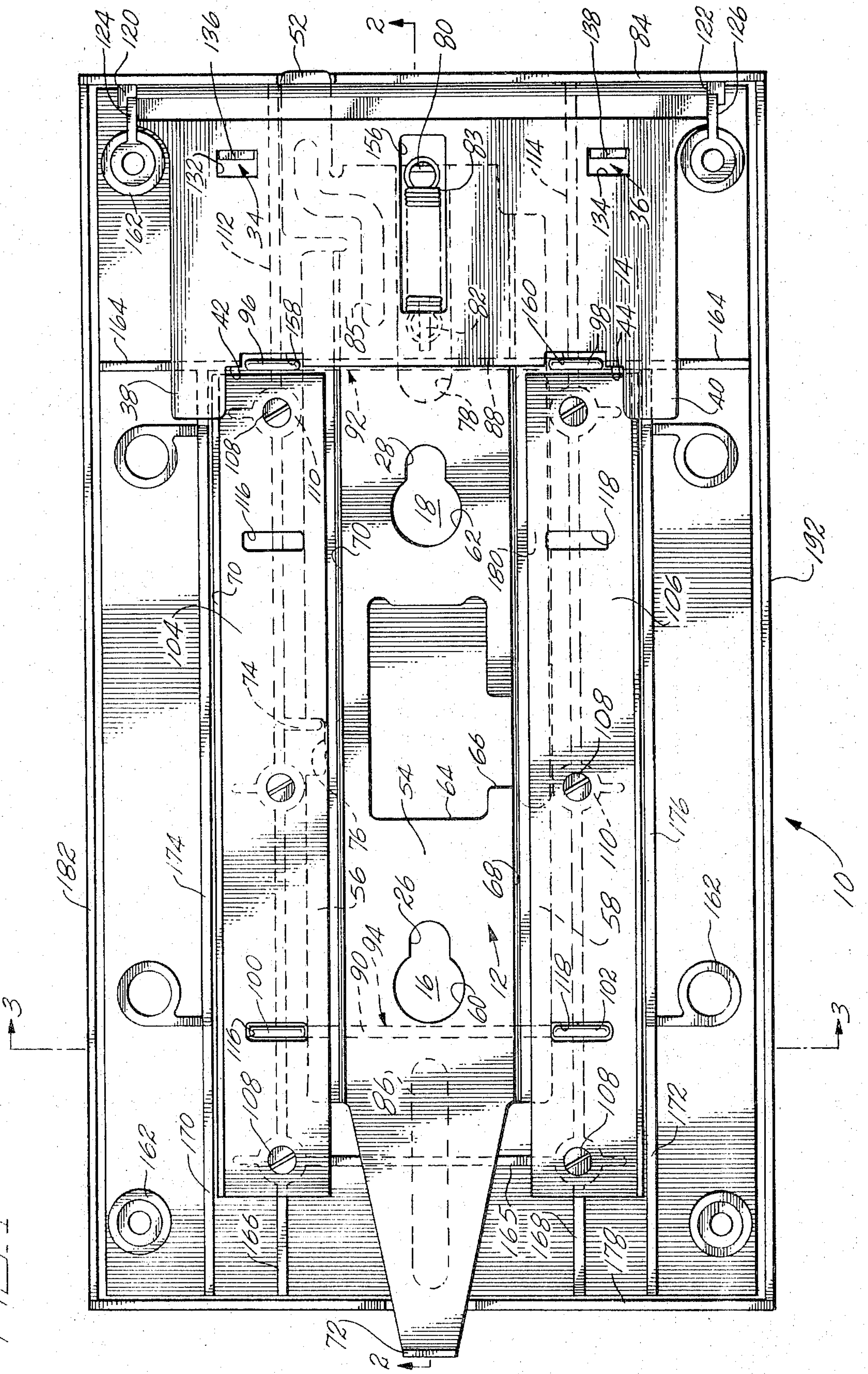
FIG. 1 is a bottom plan view of the preferred telephone wall mount of the present invention.
Figure 2:
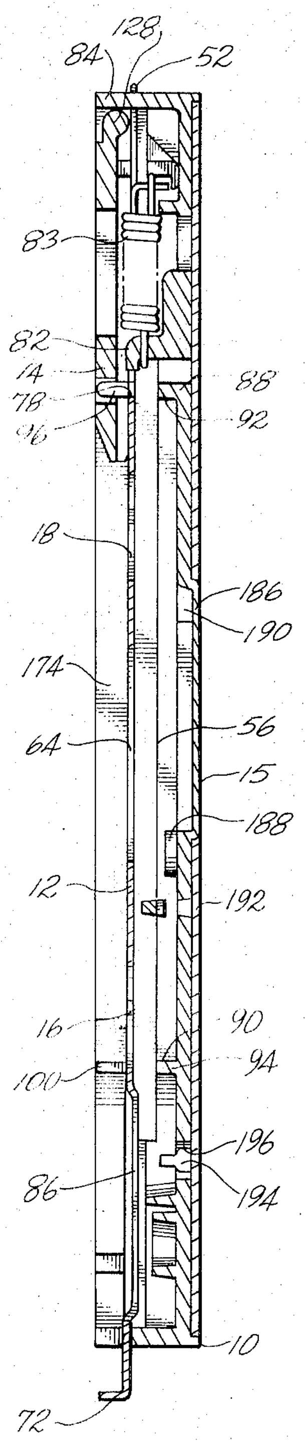
FIG. 2 is an elevational half section of the wall mount of FIG. 1 taken along line 2—2 thereof.

With reference to FIGS. 1 and 2 the wall mount of the present invention in general includes a base 10, a latch 12 and a guide 14. The base provides for the mounting of a telephone instrument on the wall mount and for the mounting of a latch and guide within the base. For the mounting of a telephone instrument the base has a generally planar mounting surface 15 defined by a ceiling of the base.

Latch 12 is capable of limited longitudinal movement of the base between a normally closed or locked position and an open position. It has a pair of longitudinally spaced-apart key holes 16 and 18 for engaging cooperating studs 20 and 22 of a faceplate 24 (see FIG. 6) of a telephone outlet. More in particular, key holes 16 and 18 are necked at 26 and 28 so that the edges of the necks are in interference with the heads of the studs when the necks are in reduced diameter portions 30 and 32 of the studs.

Guide 14 is pivotally mounted to the base for rotation between a closed position, the position illustrated in FIGS. 1 and 2, and an open position. The guide's open position is determined by cooperating catches 34 and 36 (FIG. 4) of the base and the guide, and there are means provided to temporarily keep the guide open until a force is applied to it during the swinging of the mount into position against the telephone outlet.

Guide 14 has a pair of longitudinally extending ears 38 and 40 and a pair of lateral shoulders 42 and 44 adjacent to the ears on their interior lateral sides.

Figure 6:
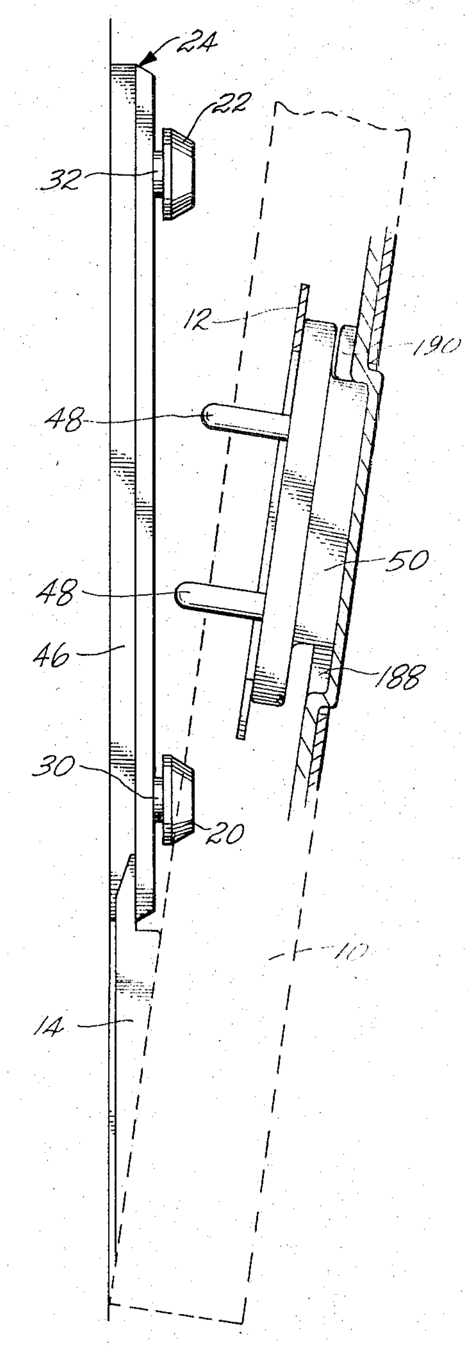
FIG. 6 illustrates the method of attachment of the wall mount to a wall.

Briefly, when it is desired to wall mount a telephone, guide 14 is swing out into its open position illustrated in FIG. 6. Latch 12 is opened. Ears 38 and 40 are inserted in longitudinal grooves in faceplate 24, one of which is indicated by reference numeral 46 in FIG. 6. Shoulders 42 and 44 of the guide engage the upper lateral surface of the faceplate. In this position force is applied to the mount to swing it about the guide's pivot flush against the wall and with plug stabs 48 of a plug 50 piloted into stab receptacles of a jack. Latch 12 is then released for the receipt of necks 26 and 28 of key holes 16 and 18 on reduced diameter portions 30 and 32 of the studs of the faceplate. If this engagement is not effected, a flag 52 of the latch will be exposed and the installer will know that a second attempt at latching must be made.

Figure 3:
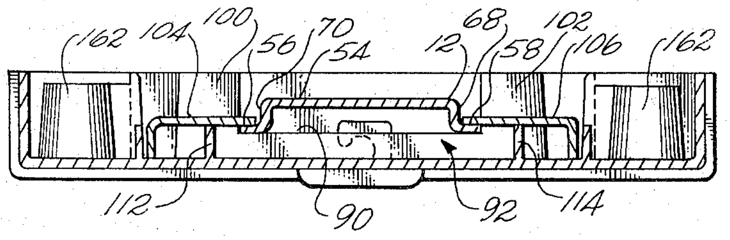
FIG. 3 is a sectional view in elevation taken along lines 3—3 of FIG. 1 with certain structure omitted for clarity.

In greater detail, latch 12, as is clear from FIG. 3, has an intermediate section 54 which is elevated relative to two laterally disposed and longitudinally extending rails or glides 56 and 58. Key holes 16 and 18 are in the intermediate section. These key holes have large diameter portions 60 and 62 for passing the heads of the faceplate's studs and necked portions 26 and 28 to present material of the latch underneath the heads of the studs. A centrally disposed hole 64 of generally rectangular outline in the latch admits the plug carried by the base of the mount. The longitudinal length of the rectangular hole is greater than that of the plug stabs to account for the relative longitudinal movement between the two during operation of the latch in installing and removing the mount from the faceplate. The edges of the hole overlie the body of the plug to loosely keep it in place in the mount. A lateral relief 66 at the side of the latch is made to clear a projection on the jack. This relief extends slightly into a wall 68 connecting glide 58 with the intermediate portion of the latch. A wall 70 connects glide 56 with the intermediate portion. An actuating tab 72 extends from the bottom end of the latch through the base for opening the latch. The tab is bent at right angles to the plane of the latch to facilitate actuation.

A lug 74 of base 10 extends laterally into a recess 76 in glide 56. The length of this recess establishes the amount of longitudinal travel of the latch. An axial hole 78 in the latch receives a return spring 83 acting between the base and the latch. The return spring urges the latch closed with flag 52 drawn inside the base. The latch has a T-tab 80 at its upper end which extends at a right angle to the general plane of the latch for engaging a loop of a return spring 83. The spring is anchored to the base at a hook 82 of the base. Flage 52 extends from the plane of the intermediate section laterally and then longitudinally through a top wall 84 of the base. The function of the flag is to indicate locking of the latch to the studs when the flag is not showing. Reinforcing ribs 85 and 86 are formed in the latch to provide flexural rigidity in a standard manner.

Glides 56 and 58 of latch 12 rest on cradles defined by laterally extending bights 88 and 90 of mount saddles 92 and 94, respectively. These bights determine the depth position of the latch and guide the latch. Lateral guidance of the latch is effected through pillars 96 and 98 of saddle 92 and pillars 100 and 102 of saddle 94. These pillars extend the depth of the base.

The latch is further held in place by a pair of angle straps 104 and 106 which have a portion extending over glides 56 and 58, respectively, to keep them on the bights of the saddles. The straps are fastened to the mount through screws 108 threaded into mounting bosses 110 of the base. Longitudinal ribs 112 and 114 of the base also support the straps. Rectangular cutouts 116 and 118 in the straps receive the pillars of the saddle. The cutouts are provided in two positions for each strap so that the straps are symmetrical about a lateral centerline and are interchangeable with each other whether used on the left or right side of the mount.

Guide 14 has a pair of laterally extending, generally cylindrical pins 120 and 122 which are received in appropriate sized cylindrical holes in pivot mounts 124 and 126, respectively, of the base. One side of the pivot pins is flat so that the guide can be inserted in the pivot mounts and rotated from its insert position to lock it in place. A lateral rib 128 extends between the pivot pins of the guide to give it rigidity. The guide also has perimetric ribs, not completely shown, for stiffening. A portion of one such perimetric rib is shown in FIG. 4 by reference numeral 130.

Rectangular core pulling holes 132 and 134 are on either side of the longitudinal centerline of the guide and expose catches 34 and 36. The catches have hooks 136 and 138 for engaging cooperating hooks on the base.

Figure 5:
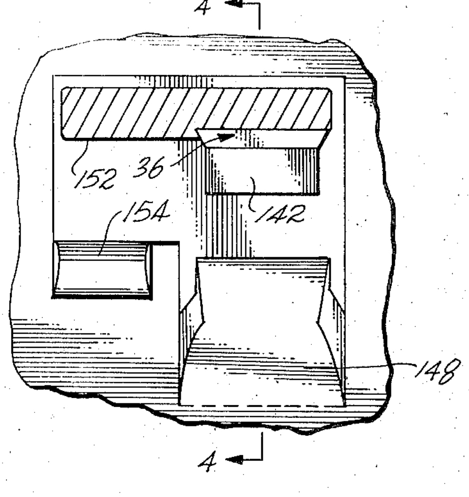
FIG. 5 is a top plan view taken along lines 4—4 of FIG. 3.
Figure 4:
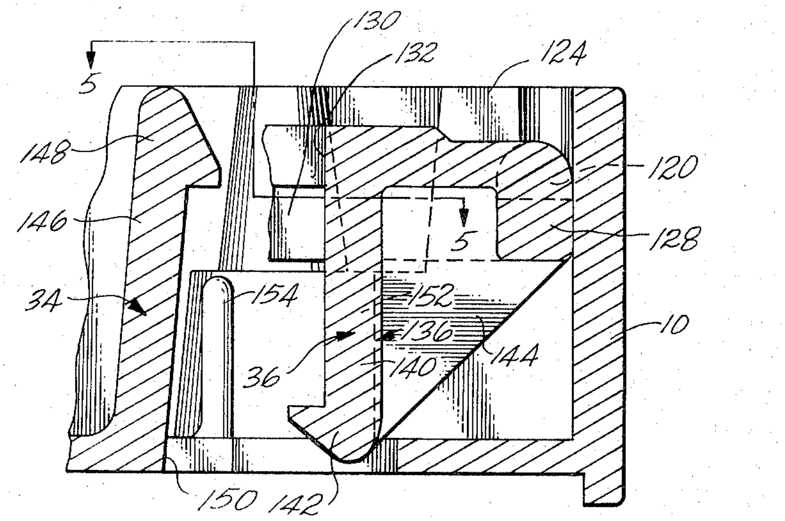
FIG. 4 is a detail of the engageable hooks used to limit and define the indexing guide's open position as well as the means used to keep the guide open until the mount begins to swing flush against a wall.

With reference to FIGS. 4 and 5, the cooperation between one such set of hooks for catch 36 is depicted. In FIG. 4 hook 136 depends from the plane of the guide and has a shank 140 and a head 142. A reinforcing gusset 144 extends from the rear of the shank to lateral reinforcing rib 128. The hook is relatively wide in extent, as indicated in FIG. 5. The base hook is similar to the guide hook and extends from the ceiling of base 10 opposite the line of extension of hook 136. A shank 146 extends immediately from the base and is capped by a head 148. A core hole 150 in the base for pulling a core which defines the head of the hook also provides a recess for the hook of the guide. A wing 152 of the guide extends laterally of hook 136 and is disposed to cooperate with a free standing rib 154 of the base for limited interference close to the open position of the guide. Stated in different words, the wing rides up and snaps over the free standing rib to keep the guide open for the convenience of the wall mount installer. With the application of a modest force on the guide tending to bring it back into the plane of the mount, the wing snaps back over the free standing rib.

The guide also has a longitudinally extending slot 156 disposed to accept the upper portion of latch return spring 83. Cutouts 158 and 160 interiorly adjacent shoulders 42 and 44 are provided to clear pedestals 96 and 98 of the upper saddle of the base.

The base has a plurality of foot mounts 162 which receive resilient feet for engagement with the walls surrounding the outlet. These mounts are molded integrally into the ceiling of the base. The base also has lateral reinforcing ribs 164 extending outwardly from pedestals 96 and 98 of saddle 92 at the upper end of the mount. A lower stiffening rib, 165 extends laterally between strap mounting bosses. Longitudinally extending reinforcing ribs 166 and 168 extend the length of the base and provide a stiffening function. Outwardly of these ribs are ribs 170 and 172 extending from medial longitudinal ribs 174 and 176 to a bottom wall 178 of the base. These ribs also give strength to the base. Medial ribs 174 and 176 extend the depth of the base.

Medial ribs 174 and 176 abut the longitudinal sides of the faceplate when the mount is installed to prevent lateral movement of the mount. Upper pillars 96 and 98 and lower pillars 100 and 102, respectively, abut the upper and lower edges of the faceplate to prevent longitudinal movement of the mount of the faceplate.

A relatively long longitudinal hole 180 in the roof of the base provides for passage of a wiring harness from the plug to a telephone mounted on the base. The length of the slot is to accommodate different telephone units' different wiring locations.

Base 10 has a recess 186 for receiving plug 50. The recess has longitudinally positioned lugs 188 and 190 to loosely fix the longitudinal position of the plug. The plug is maintained in the recess by latch 12, as is evident in FIG. 6. This retention allows stabs 48 of the plug to align themselves in the stab receptacles of the jack during rotation of the mount flush against the wall, notwithstanding angular misaligning between the mount and the wall. In short, the plug is capable of displacing slightly with respect to the mount during installation to accommodate the angular misalignment which would otherwise occur.

The actual mounting of a telephone instrument on the base is effected in a standard manner as through fasteners and it is preferred to provide several fastener anchors on the mount to accommodate different telephone instruments.

The base has a decorative cover 192, the bottom edges of which are shown in FIG. 1 and the upper surface of which is shown in FIG. 2. This cover wraps around the top of the base and can be attached to the base as by twist tabs 194 of the cover extending through slots 196 in the roof of the base.

In operation, guide 14 is swung out to its open position with wing 152 snapping over a standing rib 154 to maintain the guide open. Ears 38 and 40 are then inserted in the longitudinal slots of faceplate 24, with shoulders 42 and 44 abutting the upper horizontal surface of the plate. Latch 12 is opened by pushing on tab 72 against the restraining force of spring 83. This exposes flag 52. With the latch open, the mount is swung about the pivot axis of the guide into the position flush against a wall in which the faceplate is mounted, and with studs 22 and 20 in the large portion of key holes 16 and 18, the latch is then released. If necks 26 and 28 of the key holes are received by reduced diameter portions 30 and 32 of the studs and with release of the latch, flag 52 will withdraw into the base, as indicated in FIG. 1. In the event that such registration is not achieved the flag will remain exposed and the installer will know that mounting must be re-attempted. To remove the mount, tab 72 is again pushed to bring the large portion of the key holes into position to clear the heads of studs 20 and 22. In this position the mount is swung about the pivotal axis of the guide so that the key holes clear the studs, at which point the mount can be removed. During installation and removal of the mount on and off the face plate, the plug is capable of slight vertical displacement with respect to the base to accommodate vertical misalignment between the base and the faceplate occurring during this transition. When installed, obviously the plug will electrically couple the telephone to the telephone service by its receipt in the jack or plug receptacle of the outlet.

The present invention has been described with reference to a certain preferred embodiment. The spirit and scope of the appended claims should not, however, necessarily be limited to the foregoing description.

What is claimed is:

1. An improved wall mount for mounting telephones against a wall to a telephone service outlet installed in the wall comprising:

a. a base adapted to lie flush against the wall and having a mounting surface adapted to mount a telephone instrument;

b. means in the base to loosely retain a plug and to couple the telephone instrument to the service outlet through the plug upon installation of the mount on the outlet;

c. guide means in the base for guiding the mount during installation into a predetermined lateral and elevational position with respect to the telephone outlet and electrically coupling the plug to the service outlet;

d. a latch translationally mounted in the base for selective movement between an open and a closed position, the latch having at least one opening with a periphery disposed in the closed position of the latch to neck in behind the head of a headed stud of the outlet and secure the mount to the outlet at the stud around a substantial portion of the head;

e. means biasing the latch into the closed position; and f. means for opening the latch externally of the base by overcoming the biasing means upon the application of a force to the opening means.

2. A mount for mounting a telephone instrument to a generally planar telephone outlet on a wall comprising:

a. a base for mounting the telephone instrument;

b. means in the base for selectively locking the mount to the telephone outlet including;

i. a latch translationally mounted in the base; and ii. means on the latch for engaging at least one protruding stud of the outlet and locking the mount thereto, the engaging means including at least one opening in the latch for receipt behind a head of the stud and interference therewith in a direction away from the plane of the telephone outlet;

c. means in the base to loosely retain a plug for electrically coupling the telephone instrument to the telephone outlet with mounting of the mount on the outlet; and d. guide means in the base for guiding the mount during installation into a predetermined lateral and elevational position with respect to the telephone outlet and electrically coupling a plug carried by the mount with a jack in the telephone outlet.

3. The mount claimed in claim 2 wherein:

means is provided to bias the latch into a locking position.

4. The mount claimed in claim 3 wherein:

the base has a pair of longitudinally spaced-apart saddles, each saddle having a pair of laterally spaced-apart pedestals and a bight between the pedestals, the latch being between the pedestals on the bights and positioned thereby; and means is included for retaining the latch on the bights.

5. The mount claimed in claim 4 wherein:

a. the latch has a pair of spaced-apart longitudinal glides for resting on the bights; and b. the latch retaining means includes a longitudinal strap secured to the base underlying each glide.

6. The mount claimed in claim 2 wherein the guide includes:

a. a pair of laterally spaced-apart ears for receipt in longitudinal slots in a faceplate of the outlet;

b. a laterally extending engagement shoulder on the interior side of each ear for engaging a horizontal upper surface of the faceplate; and c. pivot means for pivotally mounting the guide to the base for rotation between an open position at an angle with the plane of the base and a closed position generally within the base and parallel with the plane thereof.

7. The mount claimed in claim 6 wherein the guide and the base have means for maintaining the guide in its open position until a force is applied on the guide tending to close it.

8. The mount claimed in claim 7 wherein the guide and the base have means for preventing the guide from rotating in a direction from the closed to the open position past the open position.

9. The mount claimed in claim 7 wherein:

a. the guide has at least one catch extending from the plane thereof towards the roof of the base; and b. the base has a catch extending from the roof thereof for engagement by the catch of the guide and thereby determining the guide's open position.

10. The mount claimed in claim 2 wherein:

the latch has a flag translatable through a wall of the base to indicate that the latch is not locked.

11. The mount claimed in claim 2 wherein:

means is provided between the base and the latch to limit the translational movement of the latter.

12. An improved wall mount for mounting telephones against a wall to a telephone service outlet installed in the wall comprising:

a. a base adapted to lie flush against the wall and having a planar mounting surface adapted to mount a telephone instrument;

b. means in the base to loosely retain a plug for electrically coupling the telephone instrument to the service outlet during mounting of the wall mount to the outlet;

c. a guide pivotally secured to the base for rotation about a pivot axis between a closed position and an open position, the closed position being in the base and the open position being at an angle from the plane of the mounting surface, the guide having pairs of spaced-apart ears and spaced-apart engagement shoulders for receipt in longitudinal slots of the telephone outlet and for abutting the upper surface of the telephone outlet, respectively;

d. a latch translationally mounted in the base for selective movement between an open and a closed position, the latch having at least one key hole adapted to receive a headed stud of the outlet and secure the mount to the outlet at the stud;

e. means biasing the latch into the closed position; and f. means for opening the latch by overcoming the biasing means upon the application of a force to the opening means.

13. The improved wall mount claimed in claim 12 wherein:

spaced-apart longitudinal ribs on the base are disposed to engage longitudinal edges of the outlet and prevent lateral movement of the mount with respect to the outlet; and spaced-apart lateral protrusions on the base are disposed to engage lateral edges of the outlet and prevent longitudinal movement of the mount with respect to the outlet.

14. The improved wall mount claimed in claim 13 wherein:

a. the latch has a pair of spaced-apart, longitudinal glides depending from a generally planar portion, the planar portion having a key hole;

b. the base has a pair of longitudinally spaced-apart and laterally extending saddles defining cradles on which the glides rest; and c. means is provided mounted to the base for keeping the glides on the cradles, the keeping means including a pair of longitudinal straps mounted on the base and underlying the glides to define with the cradles restraints against movement of the latch in a direction normal to the planar mounting surface.

15. The improved wall mount claimed in claim 14 wherein the saddles each include a pair of laterally spaced-apart pillars for preventing lateral movement of the latch by abutting the glides, the pillars comprising the protrusions which prevent longitudinal movement of the mount with respect to the outlet and each of the straps has a pair of longitudinally spaced-apart holes symmetrically disposed about a lateral centerline with one of the holes receiving one of the pedestals of one of the saddles.

16. The improved wall mount claimed in claim 15 wherein:

means is provided between the latch and the base to define definitive open and closed positions of the latch.

17. The improved wall mount claimed in claim 16 wherein the latch has a hole in it for receiving the plug, the edges of the hole being included in the plug retaining means.

18. The improved wall mount claimed in claim 17 wherein:

the guide has a hook;

the base has a hook disposed to be engaged by the guide's hook in the guide's open position to determine that position; and means is provided between the base and the guide to maintain the guide in its open position until a slight closing force is applied to the guide.

19. The improved wall mount claimed in claim 18 wherein the retaining means includes a free standing rib of the base and a depending wing of the guide, each disposed with respect to the other for the wing to snap over the rib and bear against the rib to maintain the guide open and upon application of the closing force to snap back over the rib and permit the guide to rotate to its closed position.

* * * * *